United States Patent [19]

Oshima

[11] Patent Number: 5,137,941
[45] Date of Patent: Aug. 11, 1992

[54] ARTIFICIAL KEY MATERIAL
[75] Inventor: Yutaka Oshima, Hamamatsu, Japan
[73] Assignee: Yamaha Corporation, Japan
[21] Appl. No.: 441,316
[22] Filed: Nov. 27, 1989
[30] Foreign Application Priority Data Nov. 29, 1988 [JP] Japan .................. 63-301896

[51] Int. Cl.$^5$ .................................................. C08K 7/08
[52] U.S. Cl. ...................................... 523/222; 523/440; 523/442; 523/457; 524/413; 524/423
[58] Field of Search ............. 523/222, 457, 440, 442; 524/413, 423

[56] References Cited

U.S. PATENT DOCUMENTS

| | | | |
|---|---|---|---|
| 3,830,777 | 8/1974 | Burton | 524/413 |
| 4,009,043 | 2/1977 | Preis | 524/413 |
| 4,029,512 | 6/1977 | Jaunarajs et al. | 524/423 |
| 4,270,594 | 6/1981 | Aignesberger et al. | 524/423 |
| 4,563,495 | 1/1986 | Kawaguchi et al. | 524/413 |
| 4,649,172 | 3/1987 | Yanase et al. | 524/413 |

OTHER PUBLICATIONS

Katz et al.; Handbook of Fillers and Reinforcements for Plastics; van Nostrand Reinhold Co.; 1978; pp. 446–460.

*Primary Examiner*—Paul R. Michl
*Assistant Examiner*—Edward J. Cain
*Attorney, Agent, or Firm*—Lerner, David, Littenberg, Krumholz & Mentlik

[57] ABSTRACT

A composition for forming the keys of a keyboard musical instrument consists predominantly of a synthetic resin. The addition of ceramic whiskers in cluster form significantly improves the workability, sweat absorption and texture of the composition.

7 Claims, 1 Drawing Sheet

ARTIFICIAL KEY MATERIAL

BACKGROUND OF THE INVENTION

The present invention relates to an artificial key material, and more particularly relates to improvements in the workability and properties of a synthetic key material used for key board musical instruments such as pianos, organs and accordions.

As well known, natural ivory is well suited for keys or surface coverings of keys of keyboard musical instruments. In addition to the high price of the material, however, the recently growing international trend for protection of natural animals hinders the free and abundant use of ivory for these purposes. Ebony, which is also used to this end, is again very high in price and, moreover, its significant variation in quality and inevitable colour fading in use limit broader use of this material for keys. Out of such a background, the use of synthetic resins as a substitute for these natural materials has acquired an enlarged market.

Thermosetting resins such as phenol and urea as well as thermoplastic resins such as polymethyl methacrylate have been generally used for production of artificial keys. Use of the thermosetting resins, however, is inevitably accompanied by the problem of poor workability in production processes, whereas the sole use of the thermoplastic resins tends to cause undesirable slippage of players' fingers on the keys during performance due to the relatively low sweat absorption of the thermoplastic resins.

SUMMARY OF THE INVENTION

It is thus the basic object of the present invention to provide an artificial key material which is highly hygroscopic for rich absorption of human sweat, well suited for working in production and still provided with an excellent texture quite close to that of natural key materials.

In accordance with the basic aspect of the present invention, an artificial key material contains ceramic whiskers dispersed in matrix resin in the form of clusters of filaments.

BRIEF DESCRIPTION OF THE DRAWING

The attached drawing is a photographic representation of the surface of the artificial key material in accordance with the present invention enlarged with 1000 magnification.

DESCRIPTION OF THE PREFERRED EMBODIMENTS

Figure 1:
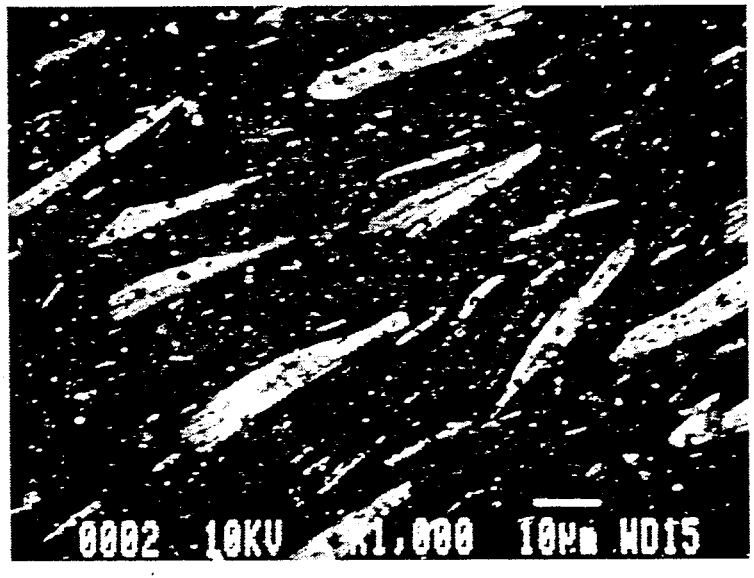

The content of the ceramic whiskers per the total of the whiskers and the resin should preferably be in a range from 5 to 50% by weight, and more preferably from 5 to 25% by weight.

The matrix resin may consist of methacrylic ester resins such as polymethyl methacrylate, acrylic ester resins, acrylonitrile-stylene resins, acrylontrile-butadiene-stylene resins, polyester resins, stylene-acrylic acid ester copolymer resins, stylene-methacrylic acid ester copolymer resins, epoxy resins or combinations of these resins. Most preferable are polymethyl methacrylate, acrylonitrile-stylene resins and acrylonitrile-butadine-stylene resins.

The ceramic whiskers are given in the form of an oxide type, sulfide type, carbide type, nitride type, silicate type and mixtures of these types. More specifically, the ceramic whiskers have a composition such as, for example, $MgSO_4 \cdot 5 Mg(OH)_2 \cdot 3H_2O$, $K_2TiO_3$, $K_2TiO_3$ or $CaSO_4 \cdot 2H_2O$.

The length of the ceramic whiskers should preferably be in a range from 1 to 1000 μm, and more preferably from 10 to 100 μm. The diameter of the ceramic whiskers should preferably be 10 μm or smaller, and more preferably 1 μm or smaller.

In accordance with the present invention, the ceramic whiskers are dispersed in the matrix resin in the form of clusters of filaments but not in the form of individual filaments. There is no special upper limit for the number of filaments in each cluster.

The length of each cluster should preferably be in a range from 1 to 1000 μm, and more preferably from 10 m. The diameter of each cluster should preferably be in a range from 1 to 1000 μm, and more preferably from 10 to 100 μm.

The artificial key material may further contain fillers, pigments, dyestuffs, plasticizers, lubricants, hardeners, antioxidants and/or antistatics.

In production of the artificial key material in accordance with the present invention, a mixture of the components are kneaded together and the kneaded mixture is shaped in a proper manner such as by extrusion, injection, molding casting, pressing after rolling or pressing. For example in the case of practical shaping via extrusion or injection, molding resin pellets are first supplied to an extruder or an injection molding machine and the whiskers are supplied into the machine at a midpoint middle step in order to avoid possible breakage of the whiskers. In the case of shaping via casting, the whiskers are mixed and kneaded with liquid resin of polyester, acryl or epoxy. Since the clusters of whiskers appear on the surface of the shaped piece, polishing is applied to the surface of the shaped piece in order to remove the surface skin. Preferably buffing is further applied to the shaped piece for surface smoothness of the end product. The shaped piece so obtained can be used either as a key or, after proper slicing, as a surface covering of a key.

As is well observed in the attached photographic representation, sub-micron size interspaces are left between whiskers in the clusters dispersed within the matrix resin and the presence of such numerous fine interspaces perform well in absorbing the sweat on the hands of players, just like porous natural ivory. The inclusion of the whiskers, which have cellent mechanical properties, significantly improves the strength, hardness, thermal transmission, appearance and rigidity of the material. The whiskers appearing on the surface of the material provide the surface with moderate frictional resistance which prevents the unintended slippage of fingers during performance.

EXAMPLES

Samples Nos. 1 and 3 were prepared using three different materials. That is, Sample No. 1 was made of the key material in accordance with the present invention. Sample No. 2 was made of the same resin but without inclusion of ceramic whiskers and Sample No. 3 was made of natural ivory. Each Sample was cut into test pieces each in the form of a rectangular sheet of 30 mm length, 10 mm width and 20 to 30 μm thickness.

For measurement of hygroscopic property, the weight of each test piece was measured after drying at 35% RH and 20° C. temperature for one week. The weight of the test piece was again measured after leaving in a dessicator saturated with steam at a temperature of 23° C. for 24 hours. The results of the measurement are shown in Table 1 in which 5 to 7% increase in weight is a good indicator of significant improvement in hygroscopic characteristics when compared with the conventional key material made of resin only.

For measurement of tensile strength, a square block of 200×200 mm² and 3 mm thickness was prepared from each Sample via injection molding. Test pieces cut out of the block were subjected to tension in the direction of resin flow during the injection process (direction A) and in a direction normal to the resin flow (direction B). The results of the measurement are shown in Table 2 in which the tensile characteristics of the material of the present invention is close to that of natural ivory.

TABLE 1

| Sample | Change in weight (%) |
|---|---|
| 1 | 5 to 7 |
| 2 | 0 |
| 3 | 15 to 18 |

TABLE 2

| Sample | Tensile strength (k/mm²) | Tensile elasticity (kg/mm²) | Elongation (%) |
|---|---|---|---|
| 1 A | 6.5 | 520 | 2.0 |
| B | 4.7 | 445 | 1.6 |
| 2 A | 5.8 | 295 | 9.8 |
| B | 3.7 | 297 | 1.5 |
| 3 A | 17.2 | 840 | 3.6 |
| B | 6.3 | 320 | 1.4 |

Frictional characteristics (coefficient of friction) of the Samples was measured under the following conditions. The results are shown in Table 3 in which the frictional characteristics of the material of the present invention is close to that of natural ivory.

| Rubbing material | deerskin |
|---|---|
| Sliding speed | 5.6 mm/sec |
| Weight in g. | 100  200  300  500  1000 |
| Area of contact | 2.5 × 6 cm = 15 cm² |
| Temperature | 23° C. |
| RH | 50% |

| Period | 1 week |
|---|---|
| Measurement A | 23° C. × 50% |
| B | deerskin wet with mist spray |

TABLE 3

| Sample | A | B |
|---|---|---|
| 1 | 0.13 | 0.87 |
| 2 | 0.23 | 0.54 |
| 3 | 0.11 | 0.94 |

I claim:
1. An artificial material for forming the keys of a keyboard musical instrument, comprising
   a matrix resin, and
   a plurality of ceramic whiskers having a length between about 1 micron and about 1,000 microns dispersed in said matrix resin, substantially all of said whiskers arranged in clusters distributed throughout said matrix resin, said cluster including a plurality of void spaces interspersed between said ceramic whiskers.

2. An artificial material as claimed in claim 1 wherein said clusters comprise between about 5 wt. % and about 50 wt. % of said material.

3. An artificial material as claimed in claim 2 wherein said clusters comprise between about 5 wt. % and about 25 wt. % of said material.

4. An artificial material as claimed in claim 1 wherein said matrix resin is selected from the group consisting of methacrylic ester resins, acrylic ester resins, acrylonitrile-stylene resins, acrylonitrile-butadiene-stylene resins, polyester resins, stylene-acrylic acid ester copolymer resins, stylene-methacrylic acid ester copolymer resins, epoxy resins and mixtures thereof.

5. An artificial material as claimed in claim 1 wherein said ceramic whiskers have a composition selected from the group consisting of $MgSo_4 \cdot 5 Mg(OH)_2 \cdot 3H_2O$, $K_2TiO_3$ and $CaSO_4 \cdot 2H_2O$.

6. An artificial material as claimed in claim 1 wherein said ceramic whiskers have a length between about 10 microns and about 100 microns.

7. An artificial material as claimed in claim 1 wherein said clusters have a diameter of between about 10 microns and about 100 microns.

* * * * *

UNITED STATES PATENT AND TRADEMARK OFFICE
CERTIFICATE OF CORRECTION

PATENT NO. : 5,137,941
DATED : 8/11/92
INVENTOR(S) : Yutaka Oshima

It is certified that error appears in the above-indentified patent and that said Letters Patent is hereby corrected as shown below:

Column 2, line 16, "m." should read --to 100$\mu$m.--

Column 2, line 49, "cellent" should read --excellent--.

Column 3, in Table 2, line 28, the heading "Tensile strength (k/mm$^2$)" should read --Tensile strength (kg/mm$^2$)--.

Column 4, line 39, "MgSo$_4$." should read --MgSO$_4$.--

Signed and Sealed this

Twenty-eighth Day of September, 1993

Attest:

Attesting Officer

BRUCE LEHMAN

Commissioner of Patents and Trademarks